(12) United States Patent
Palermo et al.

(10) Patent No.: US 7,591,967 B2
(45) Date of Patent: Sep. 22, 2009

(54) METHOD FOR THE AESTHETIC SURFACE TREATMENT OF A MONOLITHIC CONCRETE FLOOR AND PRODUCT OF THE METHOD

(75) Inventors: Ronald F. Palermo, Rochester, NY (US); Christopher F. Leva, Rochester, NY (US); Patrick T. Leva, Rochester, NY (US)

(73) Assignee: Terr-Con Decorative Concrete Floors, Inc., Rochester, NY (US)

( * ) Notice: Subject to any disclaimer, the term of this patent is extended or adjusted under 35 U.S.C. 154(b) by 288 days.

(21) Appl. No.: 10/718,390

(22) Filed: Nov. 20, 2003

(65) Prior Publication Data

US 2004/0159073 A1      Aug. 19, 2004

Related U.S. Application Data

(60) Provisional application No. 60/447,806, filed on Feb. 14, 2003.

(51) Int. Cl.
  E04B 1/16    (2006.01)
  B29C 47/00   (2006.01)
  B32B 37/00   (2006.01)
  B28B 17/00   (2006.01)
  E04G 21/00   (2006.01)

(52) U.S. Cl. .......................... 264/34; 264/35; 264/108; 264/139; 264/162; 264/245; 264/271.1; 264/293; 264/294; 264/333; 52/742.14; 52/745.19

(58) Field of Classification Search .................. None
See application file for complete search history.

(56) References Cited

U.S. PATENT DOCUMENTS

| | | | |
|---|---|---|---|
| 1,629,185 A | 5/1927 | Tone | |
| 2,296,453 A | 9/1942 | Saffert | |
| 2,835,996 A * | 5/1958 | De Paoli, Sr. | 52/315 |
| 4,281,496 A * | 8/1981 | Danielsson | 52/612 |
| 4,496,504 A * | 1/1985 | Steenson et al. | 264/69 |
| 4,748,788 A | 6/1988 | Shaw et al. | |
| 5,086,750 A * | 2/1992 | Chiuminatta et al. | 125/13.01 |
| 5,339,589 A | 8/1994 | Thrower | |
| 5,441,677 A * | 8/1995 | Phillips, Sr. | 264/31 |
| 5,794,401 A * | 8/1998 | Shaw et al. | 52/741.41 |
| 6,016,635 A | 1/2000 | Shaw et al. | |
| 6,033,146 A * | 3/2000 | Shaw et al. | 404/20 |

(Continued)

OTHER PUBLICATIONS

Advance Floor Products, www.retroplatesystem.com; The Retro Plate System; c. 2001 Advance Floor Products; Tel. 801-812-3420.

(Continued)

*Primary Examiner*—Jeffrey Wollschlager
(74) *Attorney, Agent, or Firm*—Duane C. Basch; Basch & Nickerson LLP (57) ABSTRACT

This invention relates generally to a method for forming a concrete floor as a monolithic unit, wherein a wet concrete mix is deposited and worked to achieve a generally uniform flatness of concrete and adding to the top layer thereof a decorative aggregate material. Subsequently, the surface of the concrete is worked, allowed to partially cure and then ground and polished to substantially remove surface irregularities and reveal the decorative aggregate. The floor surface may then be coated with a sealant to achieve a terrazzo-like appearance.

17 Claims, 4 Drawing Sheets

U.S. PATENT DOCUMENTS

| | | | |
|---|---|---|---|
| 6,155,907 | A | 12/2000 | Jones |
| 6,454,632 | B1* | 9/2002 | Jones et al. .................. 451/28 |
| 6,568,146 | B2* | 5/2003 | Harvey .................. 52/741.41 |
| 6,610,224 | B2* | 8/2003 | Sullivan ..................... 264/34 |
| 6,780,369 | B1* | 8/2004 | Darrow et al. ............. 264/426 |
| 6,860,794 | B1* | 3/2005 | Palushi et al. ................ 451/41 |
| 2004/0041295 | A1 | 3/2004 | Shaw et al. |

OTHER PUBLICATIONS

Spec-Data; Retro-Plate 99; Advanced Floor Products, PO Box 50533, Provo Utah; Multi-paged Datasheet.

Surface Preparation; High Production Diamond Grinding, Polishing and Dust Extraction Systems; www.concretemedic.com; www.vicintl.com; VIC International Corporation, Powell, TN 37849; c. 2001.

* cited by examiner

METHOD FOR THE AESTHETIC SURFACE TREATMENT OF A MONOLITHIC CONCRETE FLOOR AND PRODUCT OF THE METHOD

CROSS REFERENCE

Priority is claimed from the following related provisional application, which is hereby incorporated by reference in its entirety for its teachings:

"METHOD FOR THE AESTHETIC SURFACE TREATMENT OF A MONOLITHIC CONCRETE FLOOR AND PRODUCT OF THE METHOD," Palermo et al., Application No. 60/447,806, filed Feb. 14, 2003.

This invention relates generally to a concrete floor having an improved surface finish, and more particularly to a concrete floor with a finished aggregate surface providing a terrazzo-like finish and a method of producing the same as a monolithic unit.

BACKGROUND AND SUMMARY OF THE INVENTION

The present invention is directed to an expeditious and economical method for making a poured-in-place concrete floor with an integrated decorative aggregate surface. The process results in a terrazzo like appearance at a much lower cost than terrazzo flooring.

It is a common practice in the commercial construction industry to make floors from poured concrete. These floors are generally poured at one time as a monolithic slab potentially covering small or large areas—areas that can approach or exceed 50,000 square feet in some instances. The general process is to pour ready-mix concrete into a formed area, compact and generally grade the concrete with a screed and then level it. Steel reinforcement mesh or bars may be be used in the case where the anticipated load exceeds the tensile strength of the concrete at a given thickness. During the pouring a guide or straightedge may be moved back and forth across the top of the forms to "screed," or level, the freshly placed concrete. Immediately after leveling, the concrete is generally smoothed with the use of a "bull float". This presses the existing aggregate into the concrete and brings a rich mixture of fine cement paste to the surface along with water. After the concrete has been leveled and bull floated and all the surface water and sheen has disappeared, the surface of the cement is then typically smoothed using either a powered or hand float. For a coarser, nonskid finish, the surface may be textured using a stiff-bristled brush.

Concrete is a cementitious building material created by combining a mineral filler such as sand and gravel or similar aggregate with a binding agent, such as Portland cement, and water. In the pouring of floors cement mixtures are classified into three groups as a function of the ratio of sand and coarse aggregate as they relate to one part of cement by weight or volume. For example a classification of rich would contain—1 part cement, 2 parts sand, 3 parts coarse aggregate, whereas a classification lean would be made up of—1 part cement, 3 parts sand, 6 parts coarse aggregate. In the pouring of a typical floor a standard mix is used—1 part cement, 2 parts sand, 4 parts coarse aggregate. The volume of water is adjusted so as to make the mixture workable while keeping in mind Abrams' law stating that with a given concrete composition and environment factors, the concrete strength is inversely related to the ratio of water to cement whereby low water-to-cement ratios produce higher strengths.

While concrete floors produce a sturdy and durable floor, an additional surface treatment is often required to enhance the appearance and surface texture of the poured floor. A variety of concrete surface coverings and coatings are commonly used in both commercial and residential environments today. These include sealers and paint applications, as well as a plurality of vinyl tile and "sheet" good products placed over the upper surface of the concrete. The use of masonry tile and quarry stone for large scale flooring purposes has had limited acceptance due to associated material and labor costs. The distinct advantages of tile or stone for durability, maintainability and appearance are well known, however, these benefits are often cost prohibitive for large and open spaces.

Attempts have been made to overcome the limitations of the traditional appearance of monolithic cement floors that are poured in place. See for example U.S. Pat. Nos. 4,748,788, 4,281,496 and 4,496,504, all of which are hereby incorporated by reference for their teachings. In these approaches various techniques are employed for enhancing the surface appearance such as the addition of ornamental aggregate and chemical additives, as well as with the use of specialized machinery. In another process disclosed in U.S. Pat. No. 4,496,504 the coarse aggregate of the mixture is exposed on the upper surface of the concrete, in advance of a screed roller, by passing lifter arms through the concrete and thereby concentrating coarse aggregate in the wet concrete towards the surface, along with cement and fine aggregate forming an overlay to the compacted coarse aggregate. While the aforementioned methods produce the desired results they are characterized by a texture that is rustic in appearance lacking in a smooth, reflective and luxurious surface.

A further method to enhance the appearance of a concrete floor is discussed in U.S. Pat. No. 4,281,496, hereby incorporated by reference for its teachings, where the surface finishing process is reliant on the settling and absence of any aggregate in the surface region in order to produce a thin upper layer which is formed substantially of sand and cement. Once cured the surface of the concrete is treated by means of a power grinder in order to remove a thin layer from the concrete and produce a favorable uniform appearance of the surface that is absent of any defects imparted from the prior steps of leveling and compacting.

A terrazzo floor, on the other hand, is produced over the top of a pre-existing base, often concrete, by suspending aggregate chips in either a modified cementitious or a resinous binder and then grinding and sealing the surface. By not being reliant on the common aggregate filler contained within concrete the proportions, size, color, composition, cost and even the shape of the aggregate are controllable variables to effect the desired appearance and color. The composition of the aggregate can take a plurality of forms including man-made materials such as glass, or natural materials such as marble, granite and the like. The advantage of terrazzo over other commonly used surface finishing materials such as tile are a lack of grout lines as well as durability and ease of maintenance.

However advantageous this post-pouring process might be, a concrete floor or other suitable base must have been previously poured in place to provide the required substrate for the terrazzo matrix of materials to be applied thereover. The additional labor and material costs limit terrazzo as an option in many cases, especially in commercial and retail construction where the square footage will often approach or exceed 50,000 square feet.

In any event, there remains an apparent need for a relatively efficient and economical method for forming and finishing the surface of a poured in place concrete floor. Or, more specifically, a method that is integrated with the pouring and curing process, yet provides an aesthetic and durable finish while substantially decreasing the overall cost of labor and materials by eliminating the subsequent application of surface goods over the cured concrete.

In accordance with the present invention there is provided a method for forming a monolithic concrete floor providing for an integrated ornamental surface using decorative aggregate concurrent with the pouring and finishing of a concrete floor.

In accordance with a further aspect of the present invention, there is provided a concrete floor having a smooth surface finish of an integrated decorative aggregate comprising: of a monolithic, poured on site concrete floor unit; and a topical layer of applied aggregate embedded in the floor unit surface before curing, wherein said aggregate is permanently bonded within a top surface layer of said floor unit, and where said top layer is ground to a smooth surface using abrasives to expose the aggregate.

In accordance with another aspect of the present invention, there is provided a method for forming an integrated ornamental surface on a monolithic concrete floor concurrent with the pouring and finishing of the concrete floor, comprising the steps of: preparing and forming the region upon which the monolithic concrete floor is to be poured; contiguously pouring concrete throughout the formed region; floating the concrete to effectively densify the concrete; allowing the concrete to cure to a semi-stiff state; finishing the exposed upper surface of the poured concrete to produce a generally planar surface; disseminating a quantity of non-permeating aggregate over the semi-stiff concrete surface; integrating the particulates of said aggregate into the upper surface of the semi-stiff concrete with a float; allowing the concrete with the integrated aggregate to at least partially cure; grinding the upper surface with the integrated aggregate therein; and polishing the upper surface with the integrated aggregate.

In accordance with a further aspect of the present invention, there is provided to a concrete floor having a smooth upper surface with an impregnated aggregate, comprising: an on site poured monolithic concrete base; and an upper layer, at the top of the concrete base, having aggregate integrated in the upper layer before curing, wherein said aggregate is permanently bonded within the upper layer and where the upper layer has been ground to expose the aggregate as part of a smooth upper surface.

The present invention, as described in greater detail below, produces the unexpected result of reducing overall costs for forming a terrazzo-like surface finish on a poured-in-place concrete floor, thereby providing the benefits of a terrazzo-like floor without the cost.

Other objects and features of the invention will be apparent to those skilled in the art based on the following description.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements.

It is known to pour wet concrete into a formed area and then screed, float and trowel the mixture to produce a flat surface. Typically, such floors are poured or deposited upon the formed substrate, which may be either a corrugated steel sheet, or earth covered with crushed gravel and perhaps a suitable vapor barrier. The floor is then screeded with a straight edge after it is poured, and then floated when hardened. The purpose of the float operation is to densify the concrete as well as to prevent the occurrence of voids by using a flat floating tool such as a "bull float". A standard concrete floor may have color or dye mix so as to color the finished floor. In the traditional technique an entire floor is commonly formed as a unit without the use of intermediate forms controlling the height or thickness of the floor and thereby creating a monolithic "slab".

In accordance with one aspect of the present invention, once the concrete is screeded and possibly after working the surface of the concrete by float or trowel, decorative materials or aggregate may be placed on the top of the poured concrete by hand, shovel, mechanical spreader or laser screed spreader, and then bull-floated or otherwise worked so as to become integrated with the top layer of the concrete. According to the techniques of the present invention, the concrete surface preferably accepts a uniformly dispersed decorative aggregate in an amount sufficient to partially or totally cover the upper concrete surface without having aggregate collect unto itself. It is this deposition of a chosen decorative aggregate that will provide the basis for the finished surface. Depending upon the desired final appearance a plurality of man-made or naturally occurring materials of uniform or varying sizes can be utilized. Decorative aggregate materials include, but are not limited to, granite, porcelain and marble chips, glass, shells or similar calcareous formations, coins, as well as various plastics and metals, including aluminum, brass, copper and zinc, or other manufactured objects having dimensions of practically any size, but typically between 6 mm to 20 mm.

Once the decorative aggregate is deposited and worked into the top surface the concrete is allowed to stand a suitable period of time, for example 0-4 hours, dependent upon ambient conditions. During this time water bleeds to the surface and the concrete sets up sufficiently to support the weight of a workman. At this time initial floating couple is commenced to smooth the surface and set the aggregate placed thereon in place. A final pass may be completed with trowel blades to provide a uniformly level surface.

The trowel technique described above is the standard and preferred technique commonly used today as the finishing operation on a poured concrete floor. However, in accordance with an aspect of the present invention, a progressive grinding operation on the cured floor produces the unexpected results of a floor surface that has a terrazzo-like appearance with significantly less time, material, labor and accordingly reduced overall costs.

Suitable rotary grinding and polishing machines, are then used approximately three to seven days later to expose the aggregate in a cured and hardened top layer of the concrete slab. In order to complete the process the floor is left to fully cure. While the floor has been polished, the concrete retains a natural characteristic porosity that promotes the receptivity of liquids that may yield permanent stains. In order to mitigate staining, as well as making the floor dust proof and abrasion resistant, a compound may sprayed or spread over the surface.

Figure 1:
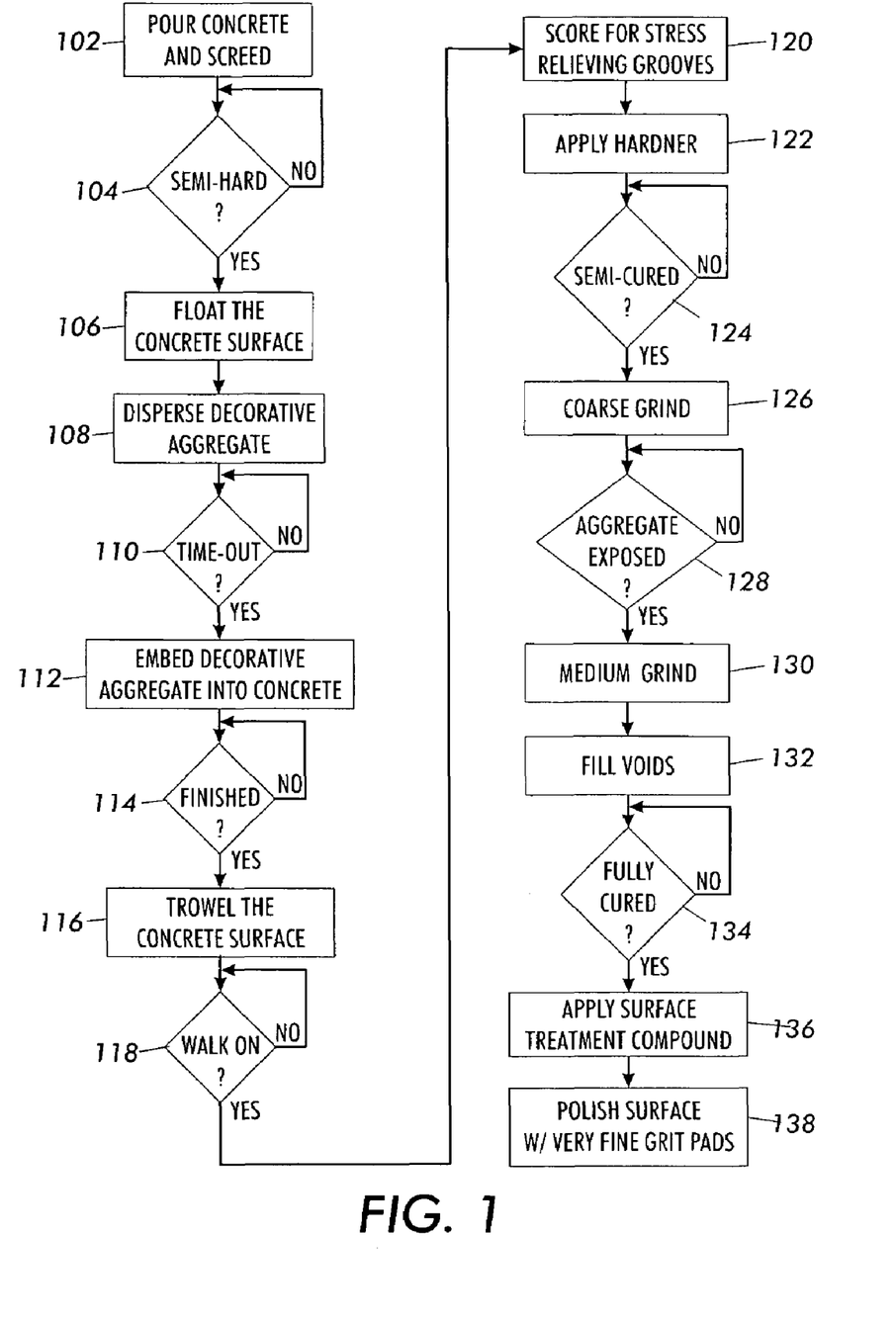
FIG. 1 is a flowchart depicting the steps utilized in producing the concrete floor with terrazzo-like surface in accordance with the present invention.
Figure 2:
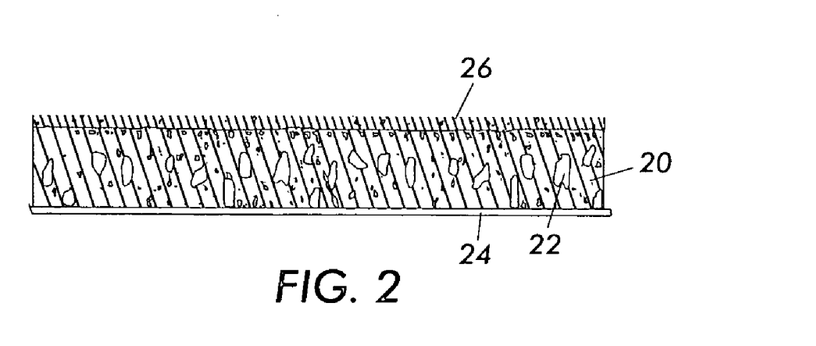
FIG. 2 is a cross-sectional illustration of a poured concrete slab.

Having described the process and method, in general, attention is now turned to a particular embodiment and method for a more detailed discussion of the invention. Referring to FIGS. 1 and 2, there are respectively depicted a flow diagram showing the steps required to achieve a poured concrete floor having a terrazzo-like finished surface, and a cross-section of a poured concrete slab. In one embodiment, illustrated in step 102, the preparation of standard concrete 20, and the pouring thereof onto a prepared foundation surface 24 is accomplished using well known techniques. The material is formed and roughly "leveled" by means of a traditional screed. As is known to those skilled in the art, a standard concrete mix for this purpose is composed of a ratio of 1 part cement, 2 parts sand, 4 parts coarse aggregate 22, for a yield strength of at least 3,000 pounds per square inch. The volume of water is so added to provide a mixture that is workable while keeping in mind Abrams' law stating that with a given concrete composition and environmental factors, the concrete strength is inversely related to the ratio of water to cement whereby low water-to-cement ratios produce higher strengths. Dependent upon the desired appearance a colorant or die can also be added to the concrete mix before pouring to alter its natural color. Use of a colorant may be preferable to accent the decorative aggregate material employed in the surface. It will be appreciated that various combinations of colorants and aggregate may be employed to achieve a desired aesthetic appearance. Once in place, concrete 20 is leveled by screeding with a straight-edge riding on the upper edge of forms (not shown).

After the concrete 20 has been deposited and screeded, for example as depicted in FIG. 2, the top surface 26 is monitored, step 104, until the concrete is semi-stiff and the density reaches a point where top surface 26 will only indent 0.25 inches in response to a normal force of 4-5 pounds per square inch being applied along a substantially perpendicular plane. This condition may be determined by a person with approximately a size 10 work shoe stepping on the surface and detecting a depression of approximately 0.25 inches. Alternatively, instruments know to facilitate similar measurement may be used. For example, a Kelly Ball or "ball penetration apparatus" which conforms to the American Society for Testing and Materials (ASTM) standard C-360 entitled "Ball Penetration of Fresh Portland Cement". At this stage in the process the surface 26 is ready to be smoothed by a conventional float operation using a rotary float machine as represented by step 106. A rotary float machine provides a rotating platform whereby float plates or combination blades are attached as "paddles" that rotate parallel to, and in contact with, the surface of the concrete. As will be described below, this same machine may also have the float plates removed to expose trowel blades and to trowel the surface to a smoother finish. With the float plates, the machine is used to "work" the poured concrete to densify the top layer of the concrete as well as to prevent the occurrence of voids.

Figure 3A:
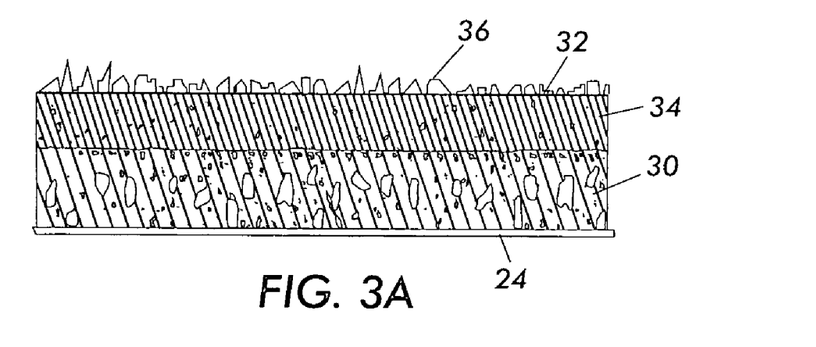
FIG. 3A is a cross-sectional illustration of aggregate dispensed onto the surface of an uncured concrete slab.
Figure 3B:
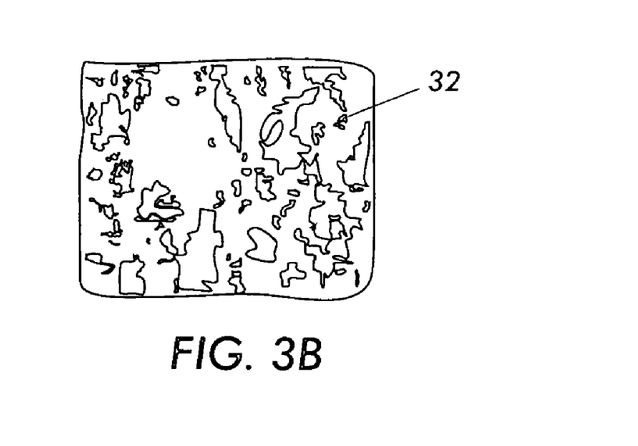
FIG. 3B an enlarged photographic representation of a surface portion of a concrete floor formed in accordance with the present invention to illustrate the surface characteristics.

Following this first operation, in step 108, a quantity of selected decorative aggregate 36 is uniformly dispensed over the entire surface to produce a cross-section as depicted in FIG. 3A and a surface as generally represented in FIG. 3B. Although depicted as occurring after the floating operation, it will be appreciated that the uniform disbursement of the decorative aggregate may occur earlier (e.g., after screeding) or later in the finishing process, and that the timing for application of the decorative aggregate may be dependent upon the floor conditions as well as the nature of the aggregate materials used.

In the instance where a stone particulate is employed as the decorative aggregate 36, concentration may be approximately equal to one pound of decorative aggregate applied to cover one square foot of surface area. In accordance with the preferred embodiment, the decorative aggregate will be spread until rejection, where the upper surface of the concrete 34 is covered by the aggregate 36 and the aggregate begins to form a secondary layer upon itself. Machines to automatically and accurately disperse the decorative aggregate are commercially available, such as the Razorback® Material Spreader designed by Allen Engineering and Sombrero Laser Spreader. In addition, another embodiment contemplates the spreading or dispersion of the decorative aggregate 36 using a high-power blower that is fed material from a hopper and transports the material via air pressure to spread it over the surface.

The decorative aggregate 36 may be composed of a natural stone product such as marble or granite chips but can also take the form of any various materials or mixtures thereof with a particulate size of 6-50 mm. For example, suitable decorative aggregate could be one or more from the following naturally occurring or man-made materials: shells, glass, plastics and metals, which can be used in any combination to create the desired artistic effect and color of the floor. Additionally manufactured objects from the group comprising: coins, beads, hardware or alike may also be distributed as or with the decorative aggregate over the surface of the concrete. While any number of decorative aggregates may be utilized in the present invention, it has been found by the applicants that in most circumstances it is quite satisfactory to use the decorative aggregate materials similar or equivalent to those that are utilized in terrazzo floors.

Figure 4:
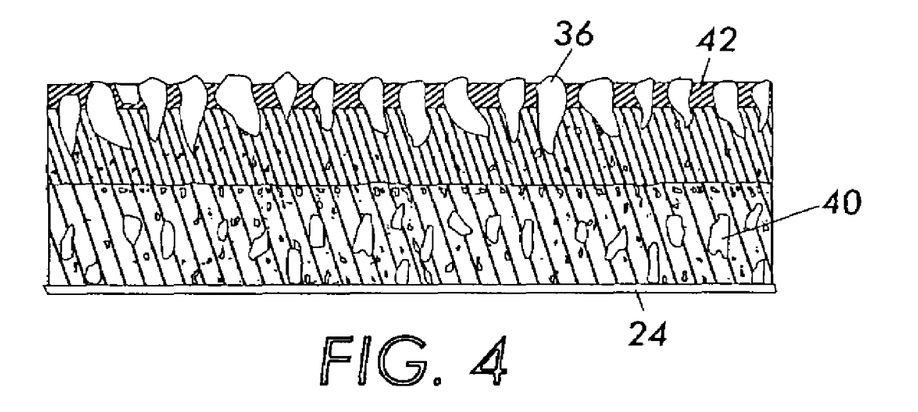
FIG. 4 is a cross-sectional illustration of the dispensed aggregate floated into the concrete material on the top layer of the monolith slab.

At step 110, the concrete 40 is allowed to set briefly, approximately 15-20 minutes or until an adequate surface region is covered with the decorative aggregate. Subsequently, as represented by step 112 a float combination or trowel machine with float plates or blades is passed over the decorative aggregate on the surface to integrate or embed the decorative aggregate 36 within the top layer or surface 42 of the concrete 40 as depicted in FIG. 4. Depending on the plasticity of the concrete 40 and the size of the decorative aggregate 36, up to four passes of the float machine may be required to assure that all the aggregate is embedded into the concrete. It is also contemplated that on larger pours, a ride-on trowel machine with pan floats or similar surface-working elements may be used to assure that the decorative aggregate is embedded within the top layer of the poured concrete.

Figure 5:
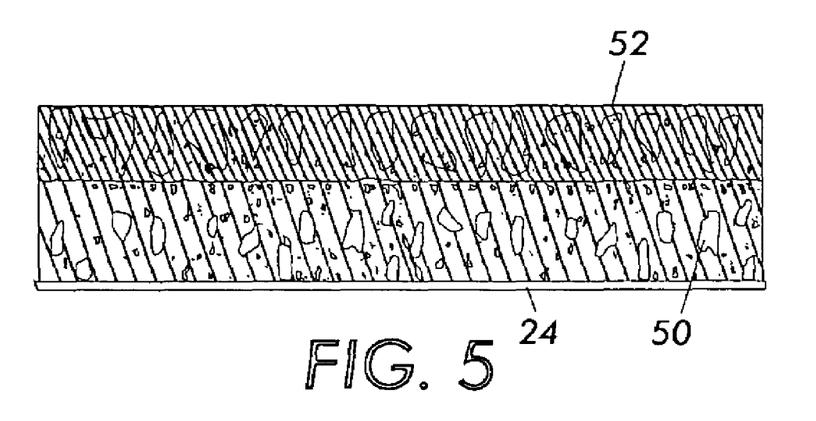
FIG. 5 is a similar cross-sectional view of the dispensed aggregate representing the effects of the grinding method by which the floor is finished in accordance with the present invention.

Next, in step 116, the same trowel machine is used, however the float blades are removed and trowel blades exposed that will smooth the concrete surface to produce a level surface 52 as depicted in FIG. 5. It will often be desirable to provide more than an initial pass of the trowel, however in subsequent operations, such as steps 126-132 for example, minor surface irregularities may be removed.

Figure 6A:
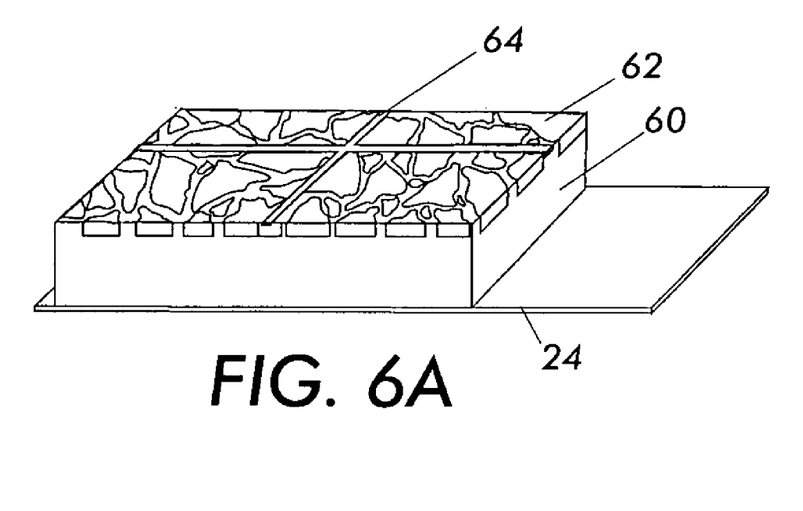
FIG. 6A depicts a partial perspective illustration of the finished and sealed surface.

After the concrete 50 sets up sufficiently to support the weight of an operator, step 118, in accordance with step 120 a diamond saw blade may be placed in contact with the concrete surface 52 in order to create strategically positioned scores or grooves 64 to facilitate the systematic normalization of acquired stress within the concrete 50 slab. It is also possible to utilize traditional surface scoring tools although such use may be labor intensive and may interfere with producing a uniform dispersion of decorative aggregate across the scored area. The grooves 64, as seen in FIG. 6, may be applied in various directions and accordingly may intentionally form a geometric pattern. The grooves 64 have an average depth of at least about 0.75 inches and higher. The general design and operation of a concrete sawing machine used for scoring the surface is well known, including hand-held and self-propelled units.

A number of variations are possible within the various embodiments of this invention. For example, step 122 provides for the possibility of dispersing (e.g., spraying or spreading) a chemical agent to seal and increase the hardness of the concrete 50. Typically a curing compound is sprayed or dispersed over the surface 50 and allowed to absorb into the top layer of the concrete to assist the surface to cure. Once this treatment is complete the floor is allowed to stand to reach a semi-cured state, for example, 3-5 days, as represented by step 124. This waiting period is not optional but is believed preferable so the concrete 50 has a sufficient cured hardness to be ground without gouging, but not fully cured so as to make grinding inefficient.

The aesthetic and ornamental concrete surface 62 of the invention is created by a series of grinding operations indicated in steps 126-130. Although various alternative grinding machines and tools may be employed, the present invention contemplates the use of a Terrco® Grinding Machine, such as Models VHLD-LP or 3100-3P, or a conventional power grinder of the type illustrated in U.S. Pat. No. 3,098,329 issued July, 1963. Rotary grinding and polishing machines are well known in the terrazzo floor industry and typically incorporate one or more circular abrasive pads, disks or drums which move in a rotary manner over the surface. The abrasive attachments are impregnated with diamonds or hard stone particles, having a grit value in the range of 24-1600, in order to facilitate the exposure of the decorative aggregate by removing a portion of the upper surface layer.

In the coarse grinding step 126, the grinding is performed using a grit in the range of 10-24 where the grinding medium is a diamond or carborundum wheel or stone. It will be appreciated that the particular grit and grinding medium are, to a certain extent, dependent upon the decorative aggregate material used. The coarse grinding may be completed wet or dry. The coarse grinding operation is continued, possibly in various directions, until the decorative aggregate is exposed uniformly over the top layer of the concrete slab as indicated by step 128. Step 126 may take between three and ten passes, and may involve progressively finer grinding grits. It is believe that altering the direction of travel of the grinding machine between passes, or at least periodically, is advantageous to achieving a uniform and smooth surface.

Next, as depicted in step 130, the surface is ground using a medium grit grinding media, generally in the 50-120 grit range, and more particularly in the 80-100 grit range. During and after this grinding step(s), which may include successively finer grinding media, the surface is flushed with water and a squeegee or similar device is used to remove the particulate that is loosened by grinding. It is also possible that a machine may be employed to clean the surface. For example, a floor cleaning machine by Tennant® may be used to complete a final cleaning and brush and collect the grinding particulate. Final polishing can be accomplished using media with a grit as low as 120 and as high as a 3600 carborundum or diamond disc. After the initial grind, the surface may also be sealed immediately for a finished product.

In some situations, surface defects such as voids and/or cavities from dislodged aggregate may remain within the ground surface of the concrete. In one embodiment, as represented by optional step 132, to facilitate a smooth surface a skim coat of a grout-like material, possibly a mixture of Portland cement and water or latex, is placed over the entire surface 52. Once applied a trowel (manual or machine) is used to spread the grout-like material into the imperfections of the floor and re-smooth the surface 52.

According to one embodiment of the present invention the floor is then allowed to fully cure for approximately twenty-eight days, step 134. Next, a surface treatment, step 136, and final polishing process, step 138, may be completed to produce a finished surface of the concrete floor.

Two alternative embodiments are contemplated for this portion of the finishing process. In a first embodiment, the top layer of the concrete is finish ground to produce a smooth, polished surface having the decorative aggregate exposed. The grinding is preferably accomplished using a grinding system such as that produced by VIC International™, such as model HTC 800 HD (using 10.625" discs operating at 300-1380 rpm), or a La Genovese™ La MB2001 grinder planetary grinder (600-1400 satellite rpm, 80-144 planetary rpm). In one embodiment, the final polishing may be accomplished in approximately three polishing steps, including: (a) a #120 grit or higher carborundum disc; (b) a #200 grit diamond pad; and (c) a #400 grit or higher diamond pad. Again, various discs and pads, with a range of grits (roughness), may be employed on the grinding machines described above, or equivalents.

Subsequent to completing the polishing step, the floor may be final-sealed using one of a number of concrete sealers/hardener treatments. For example, a water based, inorganic silicate material, such as Ashford Formula® from Curecrete Chemical Company, may be dispersed over the floor and allowed to absorb into the surface or top layer 52 of the concrete for thirty minutes at which time the remaining material may be washed off. Once the material hardens, it provides a highly-polished surface appearance, again with the exposed decorative aggregate providing a terrazzo-like appearance.

In a second embodiment, the continuation of the finishing process is also intended to provide a surface 62 which is dust proof, and has improved scratch resistance and shine. In this embodiment a surface compound interacts with the concrete and fills the microscopic pores remaining within the upper surface 62.

Figure 6B:
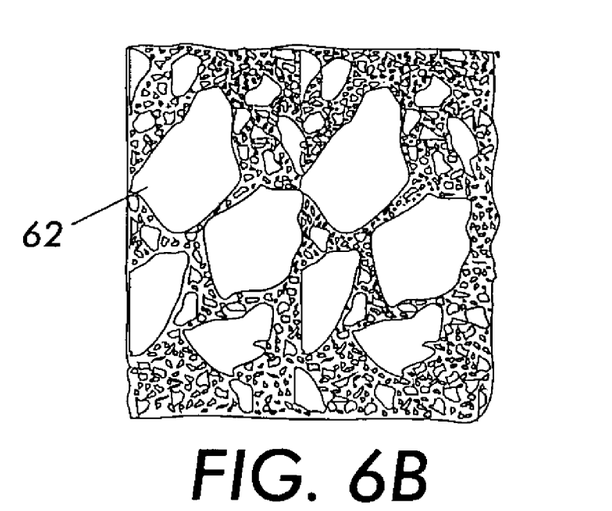
FIG. 6B an enlarged photographic representation of the finished floor surface.

Referring to step 138, and FIGS. 6A and 6B, a compound selected from the group of sodium silicate, zinc fluorosilicate, magnesium fluorosilicate or acrylic is mixed with a solvent and is dispersed over the surface. An example of such a compound is commercially available from AFD Floor Products under the trademark Retro-Plate® and as further disclosed in U.S. Pat. Nos. 6,155,907 and 6,454,632, the contents of which are hereby incorporated by reference for their teachings. To adequately polish the surface 62 following this application, a polishing machine, as described above, is used in step 138. With each successive repetition of the polishing process the grit of the pads will be increased by a grit value equal to approximately 200. A satisfactory high gloss from the sealer may be obtained with pads having a grit from about 400 to 1600.

The general process of polishing/hardening a concrete surface in accordance with the second embodiment involves first applying a hardening/densifying compound. This compound, in solution, is applied to substantially wet the surface, and is allowed to remain in contact with the surface for a period of time sufficient to allow the compound to fully soak or penetrate into the surface of the concrete so that the concrete may be hardened/densified. A diluted polishing compound is then applied to the surface to form a polishing slurry as the surface is buffed or polished using for example, a polishing machine as described above. The diluted polishing compound may comprise water alone, or it may comprise a diluted version of a hardening/densifying compound. The diluted polishing compound may be applied prior to polishing, or contemporaneously with the polishing step. In the hardening/densifying compound, the water or alcohol to silicate, siliconate, fluorosilicate, siloxane, silazane, silicon ester, and/or silane should be a ratio of from about 3:1 to 5:1. In the diluted polishing compound, where water alone is not used, the water or alcohol to silicate, siliconate, fluorosilicate, siloxane, silazane, silicon ester, and/or silane should be a ratio of from about 30:1 to 1:1. However, the preferred ratio should be about 10:1.

To adequately polish the surface following this method, it is required to pass over the surface with the polishing machine so as to allow the rotating disc, pad or drum having a grit from about 20 to 3,000 to contact substantially all areas of the surface at least once. However, two or three passes in alternating, perpendicular directions may be used to obtain superior results. During polishing a polishing compound may be used to lubricate the polishing action and impart desired shine to the surface. When the appropriate passes have been made over a given surface, the surface is cleaned and inspected to determine whether the desired level of shine has been achieved. The surface must be dry in order to determine whether the desired shine has been achieved. If the desired level of shine has not been achieved, the above process is repeated using abrasive pads of finer grit each time, and cleaning the surface between each repetition of the process. If the floor is not cleaned between successive repetitions of the process, scratching and excessive wear of the polishing disc may occur. A typical concrete surface in good condition may be initially polished with 120 to 800 grit pads, discs or drums, depending on the desired sheen. With each successive repetition of the polishing process, the grit number of the desired pad will typically increase by 200. A satisfactorily high gloss may be obtained with pads, discs or drums using anywhere from 400 to 2,200 grit, depending on the preferred level of shine. Thus, in the manner described, a concrete surface may be hardened and polished to a high gloss finish or shine.

In the various embodiments and steps described above, it will be apparent that the use of machines and other equipment, depending upon the size of the floor area, may be preferred. However, the present invention also contemplates the application of the process to smaller areas, and areas in which automated equipment may not be used, for example, along the edges of building or structures. In such situations, the various steps may be completed manually, or using equipment designed for edge work. For example, the various grinding and polishing systems described are also generally available in smaller or single-head units that may be employed to grind and polish edges and corners of concrete floors.

In recapitulation, the present invention is a concrete floor having a smooth surface finish or top layer of an impregnated decorative aggregate and a method for making such a floor.

It is, therefore, apparent that there has been provided, in accordance with the present invention a method for the production of a monolithic concrete floor having an integrated, terrazzo-like surface and a product of the method. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for forming an integrated ornamental surface on a monolithic concrete floor concurrent with the pouring and finishing of the concrete floor, comprising the following steps in order:

preparing and forming the region upon which the monolithic concrete floor is to be poured;
contiguously pouring concrete throughout the formed region to form a monolithic layer;
floating the concrete to effectively densify the monolithic concrete layer;
allowing the concrete layer to cure to a semi-stiff state;
finishing the exposed upper surface of the concrete layer to produce a generally planar surface;
disbursing a quantity of a decorative aggregate over only the surface of the semi-stiff concrete layer, wherein said decorative aggregate has a particulate size of at least 6 mm and no more than 50 mm;
integrating the aggregate into the upper surface of the semi-stiff concrete;
partially curing the concrete with the integrated aggregate;
grinding the upper surface of the partially cured concrete with the integrated aggregate therein, including partially removing some of both the partially cured concrete and the integrated aggregate material at least until the aggregate is exposed uniformly over the top of the concrete, wherein said grinding step further comprises the steps of:
a rough first pass using a rotary head concrete grinding machine having a cutting head of diamonds;
a second pass using a finer grit on a disc comprised of silicon carbide and a bonding material; and
a polishing pass with a rotary head polishing machine using between about a 200 grit to a 1600 grit diamond pad;
fully curing the concrete with the integrated aggregate; and
polishing the upper surface with the integrated aggregate to provide a generally planar and smooth surface on the monolithic concrete floor.

2. The method of claim 1 wherein the step of disseminating the decorative aggregate includes distributing an aggregate selected from the group consisting of:

marble;
porcelain;
granite;
glass;
calcareous formations;
shells;
aluminum;
zinc;
brass;
copper;
plastic; and
manufactured objects.

3. The method of claim 1 wherein the decorative aggregate is a naturally occurring material.

4. The method of claim 1 wherein the decorative aggregate is a man-made material.

5. The method of claim 1 wherein said semi-stiff state is determined by a one-quarter inch depression resulting from an applied normal force of between about 4 and 5 pounds per square inch.

6. The method of claim 1 wherein the step of pouring concrete comprises the further step of pre-mixing, with the concrete, a colorant additive.

7. The method of claim 1, further comprising applying a hardening compound to the upper surface after polishing.

8. The method of claim 7, wherein the hardening compound is selected from the group consisting of:
   silicates;
   siliconates;
   fluorosilicates;
   siloxanes;
   silazanes;
   silanes;
   silicon esters; and
   combinations thereof in a solvent.

9. The method of claim 8, wherein the solvent is selected from the group consisting of water and alcohol.

10. The method as described in claim 1, wherein at least the step of a polishing pass is repeated until the upper surface has a shine, and further including the step of applying a surface treatment to the polished upper surface, where the surface treatment is a chemical reactive concrete stabilizer providing a densified upper surface.

11. The method of claim 1 wherein the monolithic semi-cured concrete floor is scored with a diamond saw to facilitate uniform stress releasing fracture.

12. The method of claim 1 wherein partially curing the concrete with the integrated aggregate includes waiting at least about three days and no more than about seven days.

13. A method for forming an integrated ornamental surface on a monolithic concrete floor concurrent with the pouring and finishing of the concrete floor, comprising:
   preparing and forming a region upon which the monolithic concrete floor is to be poured;
   contiguously pouring concrete throughout the formed region to form a monolithic layer;
   screeding the exposed upper surface of the concrete layer to produce a generally planar surface;
   disbursing a quantity of a decorative aggregate over only the surface of the concrete layer, wherein said decorative aggregate has a particulate size of no more than 50 mm;
   integrating the aggregate into the upper surface of the concrete layer;
   partially curing the concrete with the integrated aggregate;
   grinding the upper surface of the partially cured concrete with the integrated aggregate therein to remove a layer of generally uniform thickness from the upper surface, including a rough first pass using a rotary head concrete grinding machine wherein said rough first pass uses a rotary cutting head of diamonds and a second pass using a finer grit on a disc comprised of silicon carbide and a bonding material, thereby removing some of both the partially cured concrete and the integrated aggregate material at least until the aggregate is exposed uniformly over, yet coplanar with, a top surface of the concrete;
   fully curing the concrete with the integrated aggregate; and
   polishing the upper surface with the integrated aggregate to provide a generally planar and smooth surface on the monolithic concrete floor.

14. The method of claim 13 wherein partially curing the concrete with the integrated aggregate includes waiting at least about three days and no more than about seven days.

15. The method of claim 13, wherein said rough first pass uses a grit in the range of about 10-24.

16. A method for forming an integrated ornamental surface on a monolithic concrete floor concurrent with the pouring and finishing of the concrete floor, consisting essentially of:
   preparing and forming the region upon which the monolithic concrete floor is to be poured;
   contiguously pouring concrete throughout the formed region;
   floating the concrete to effectively densify the concrete;
   allowing the concrete to cure to a semi-stiff state;
   finishing the exposed upper surface of the concrete to produce a generally planar surface;
   disbursing a quantity of a decorative aggregate over only the surface of the semi-stiff concrete, wherein said decorative aggregate has a particulate size of at least 6 mm and no more than 50 mm;
   integrating the aggregate into the upper surface of the semi-stiff concrete;
   partially curing the concrete with the integrated aggregate;
   using a series of successively finer abrasives, grinding the upper surface of the partially cured concrete with the integrated aggregate therein, including removing a generally uniform layer including some of both the partially cured concrete and the integrated aggregate material at least until the remaining aggregate is exposed uniformly over the top of the concrete, wherein said grinding step further comprises
      a rough first pass using a rotary head concrete grinding machine having a cutting head of diamonds;
      a second pass using a finer grit on a disc comprised of silicon carbide and a bonding material; and
      a polishing pass with a rotary head polishing machine using between about a 200 grit to a 1600 grit diamond pads
   fully curing the concrete with the integrated aggregate; and
   polishing the upper surface with the integrated aggregate to provide a generally planar, smooth surface with exposed aggregate, on the monolithic concrete floor.

17. The method of claim 16, wherein said grinding step further comprises a rough first pass using a grit in the range of about 10-24.

* * * * *